United States Patent [19]

Cannelli et al.

[11] Patent Number: 4,734,894

[45] Date of Patent: Mar. 29, 1988

[54] ELECTROACOUSTIC PULSE SOURCE FOR HIGH RESOLUTION SEISMIC PROSPECTINGS

[75] Inventors: Giovanni B. Cannelli; Enrico D'Ottavi; Silvio Santoboni, all of Rome, Italy

[73] Assignee: Consiglio Nazionale Delle Ricerche, Rome, Italy

[21] Appl. No.: 878,377

[22] PCT Filed: Oct. 22, 1985

[86] PCT No.: PCT/IT85/00039

§ 371 Date: Jun. 4, 1986

§ 102(e) Date: Jun. 4, 1986

[87] PCT Pub. No.: WO86/02739

PCT Pub. Date: May 9, 1986

[30] Foreign Application Priority Data

Oct. 23, 1984 [IT] Italy .............................. 49127 A/84

[51] Int. Cl.[4] .............................................. G01V 1/00

[52] U.S. Cl. .................................... 367/147; 181/113

[58] Field of Search ............... 367/137, 138, 147, 148, 367/151, 171, 174; 181/108, 110, 113, 114, 116, 119, 118; 376/144, 145; 372/86; 315/241 P, 308

[56] References Cited

U.S. PATENT DOCUMENTS

| | | | |
|---|---|---|---|
| 2,167,536 | 7/1939 | Suits | 367/147 |
| 2,559,227 | 7/1951 | Rieber | 128/24 A |
| 3,106,982 | 10/1963 | Wade | 181/108 |
| 3,356,178 | 12/1967 | Nash | 181/113 |
| 3,895,188 | 7/1975 | Ingraham | 367/151 X |
| 4,369,395 | 1/1983 | Stempeck | 315/241 P |
| 4,398,127 | 8/1983 | Bahn et al. | 315/241 P X |

FOREIGN PATENT DOCUMENTS 1395127 3/1965 France .

*Primary Examiner*—Deborah L. Kyle
*Assistant Examiner*—Brian S. Steinberger
*Attorney, Agent, or Firm*—Brumbaugh, Graves, Donohue & Raymond

[57] ABSTRACT

A seismic source consists of an electroacoustic transducer having a metallic structure, shaped like an empty round paraboloid (1) closed at the base by means of an elastic diaphragm and filled with a proper liquid. Around the focus of the paraboloid two main electrodes (5) are set and an auxiliary electrode (6) is put between the first ones. The main electrodes (5) are connected to a set of capacitors ($C_o$) supplied by a high-voltage power supply (HT). One of the main electrodes (5*b*) and the auxiliary electrode (6) are connected to a trigger pulse generator (EHT) driven by a remote control (4) via a synchronization pulse generator (3). The discharge between the main electrodes (5) primed by a preliminary spark, generates an acoustic pulse through the liquid medium of the transducer on the ground where the paraboloid (1) is engaged. So the transducer generates seismic waves utilized for shallow prospecting both on land and underwater.

6 Claims, 15 Drawing Figures

FIG.10 bis

ELECTROACOUSTIC PULSE SOURCE FOR HIGH RESOLUTION SEISMIC PROSPECTINGS

This invention concerns an electroacoustic pulse source for high-resolution seismic prospectings.

TECHNICAL FIELD

The device can greatly interest industry owing to the manifold application fields involved. It can have useful exploitation in archaeological explorations where acoustic techniques have not yet met with success up to now. Further, the device can be considered a valid means for location of water tables, inland water contour exploration, study of characteristics and behaviours of soils planned for building up operas such as foundations, tunnels, dams and nuclear power plants.

BACKGROUND ART

Sources for deep seismic explorations are very expensive and often not suitable for shallow prospectings for which higher resolutions are required. The most common seismic sources are explosive charges, vibrators, and weight-dropping devices. In near-surface prospectings such as the archaeological one, explosives, although of reduced power, had to be excluded because they do not guarantee a non destructive exploration and require an expensive handling such as security measures, shot-hole drilling and so on. Under many aspects seismic vibrators would represent an adequate means, but their cost is too high. The most simple and economic mechanical devices, usually utilized for shallow prospecting, suffer from several shortcomings; the energy supplied by them is lost in most part, like surface waves and shear waves and is limited to lower frequencies, and the shot repetition rate is too low.

This latter type of source, already experienced at IDAC (G. B. Cannelli, "Geoacoustic Measurement of p-Wave Velocity by Seismic Refraction Technique", Riv. Ital. di Acustica, 8(1), 39–57, 1984), allows only rough prospectings on land.

DISCLOSURE OF THE INVENTION

The seismic wave source, according to this invention, mainly aims at improving the resolution in the acoustic prospectings of shallow underground (from some meters to a few hundred meters). Shallow depths are almost completely ignored in mining research prospectings which are interested to depths of the order of thousand meter and over. These latter are considered more remunerative, and on the other hand, do not acquire high resolutions owing to the macroscopic disomogeneities involved. The seismic wave source according to this invention comprises an electroacoustic transducer carried out so that inside a metallic structure, substantially shaped like a bell, closed at the base by an elastic diaphragm and filled with a liquid having an high electric resistivity and a relatively low dielectric strength, two main electrodes, with adjustable positioning, are set around the focus of the paraboloid and an auxiliary electrode is put between the first ones; a set of capacitors supplied by a high-voltage power supply, and electrically connected, to the main electrodes; a trigger pulse generator electrically connected to one of the main electrodes and to the auxiliary electrode; a synchronization pulse generator which controls the trigger pulse generator and generates the electric pulses necessary to pilot a seismograph and a control oscilloscope, a remote control to drive the synchronism signals by means of a manual operated pushbutton. The above mentioned metallic structure of the electroacoustic transducer is preferably shaped like an empty round paraboloid.

In order to generate a seismic wave by means of the source of this invention, a high voltage discharge is primed between the main electrodes around the paraboloid focus. The produced acoustic pulse is transmitted via the liquid medium to the soil on which the base of the transducer is fixed through the diaphragm that assures the seal of the liquid inside the transducer so as not to cause the contact with the earth surface.

The main advantages of the invention consist in the fact that it carries out a seismic source of "nondestructive" type and that it produces P-waves (longitudinal waves) with such frequency characteristics, directivity patterns and energy, that it allows a good resolution of underground inhomogeneities from a depth of some meters to about 100 m. In particular, in the amplitude spectrum of the acoustic pulse produced by the source of this invention, the presence of an appreciable contribution may be observed to frequencies up to some kHz considered more suitable for shallow prospectings. Moreover, the seismic wave generated by the parabolic transducer has a greater energy concentration in P-waves (the most used waves in the seismic prospecting), in comparison with that of a mechanical source having the same energy. The possibility of electrically changing the source allows to control, to a certain extent, the pulse shape, its duration and repetition rate. So, lower frequencies can be utilized to explore anomalies to a great depth and higher frequencies to resolve small subsurface inhomogeneities. Moreover, in regard to the high-voltage discharge primer, this is accomplished in such a way that possible losses of the available electrostatic energy are minimized. In fact, the energy supplied to the auxiliary electrode, in order to modify the ionization state of the liquid medium, is not substracted from the electrostatic energy required to generate the seismic wave.

BRIEF DESCRIPTION OF THE DRAWINGS

This and other advantages and features of the invention will be more evident from the following description of an embodiment together with the enclosed drawings in which:

FIG. 10*bis* shows in comparative way two diagrams corresponding to the power-spectra of the acoustic pulses in air for two different electrical capacitances (a): $C_o=40$ μF.

(b): $C_o=360$ μF.

Figure 11A:
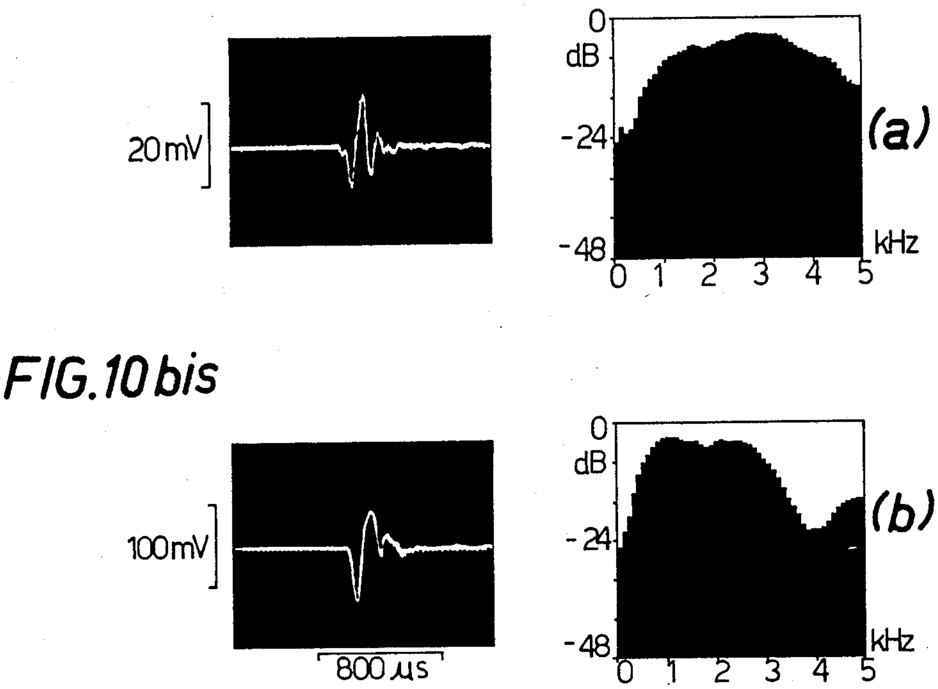
Figure 11A:
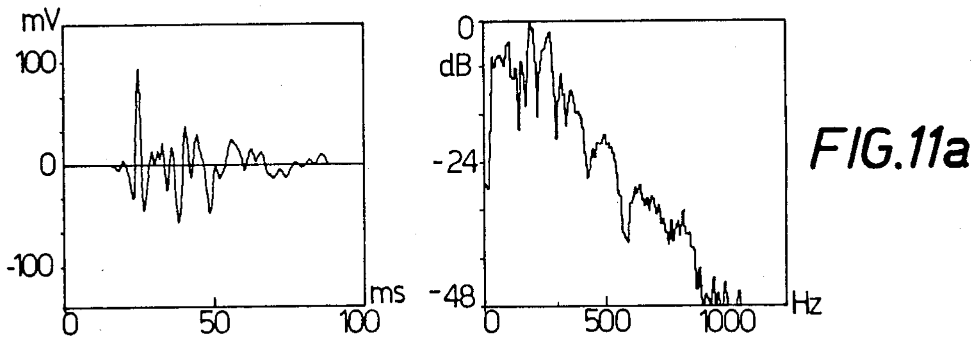

FIG. 11*a* shows acoustic pulses signatures of the parabolic source detected at a depth of 2 m in wheatered soil and their respective amplitude spectra for the capacitance $C_o=40$ μF.

Figure 11B:
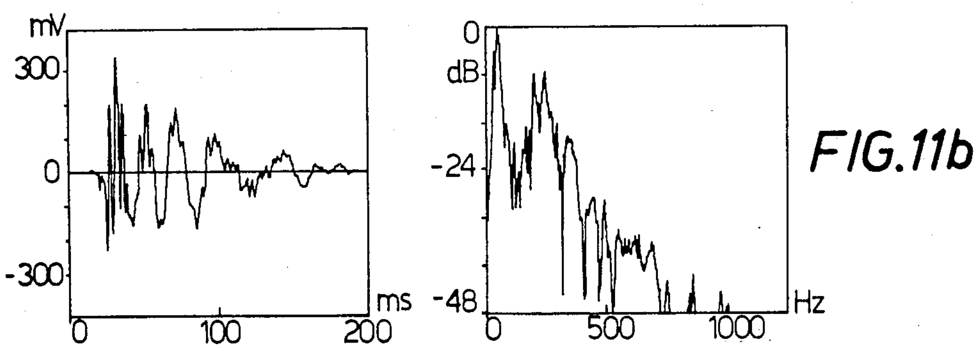

FIG. 11*b* shows acoustic signatures of the parabolic source detected at a depth of 2 m in wheatered soil and their respective amplitude spectra, for the capacitance of $C_o=360$ μF.

Figure 12:
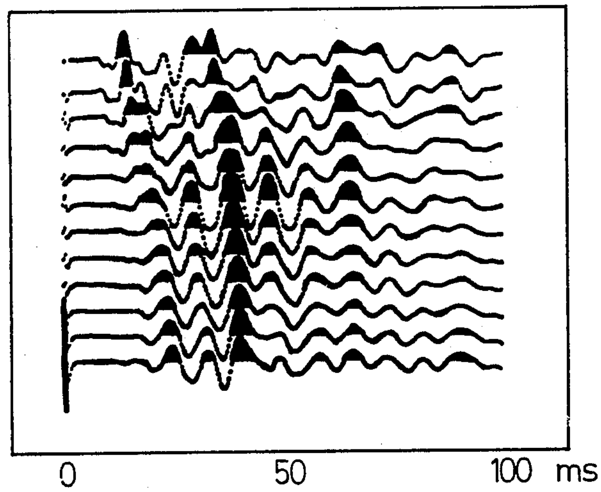
Figure 12:
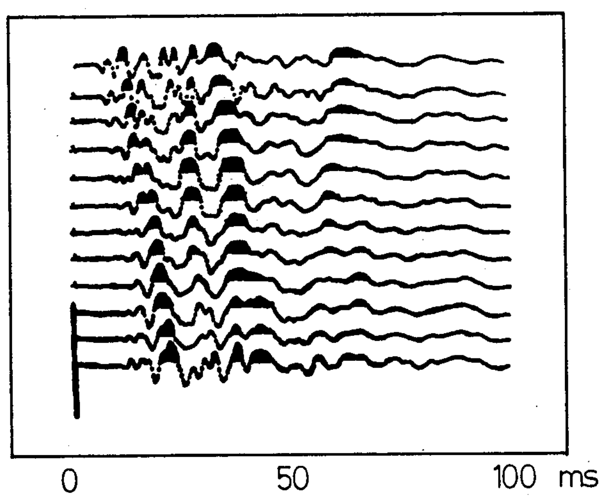

FIGS. 12P and 12H are, for the sake of comparison, the seismograms corresponding to the electroacoustic source P according to this invention, and those generated by a mechanical source H, respectively.

BEST MODE OF CARRYING OUT THE INVENTION

Figure 1:
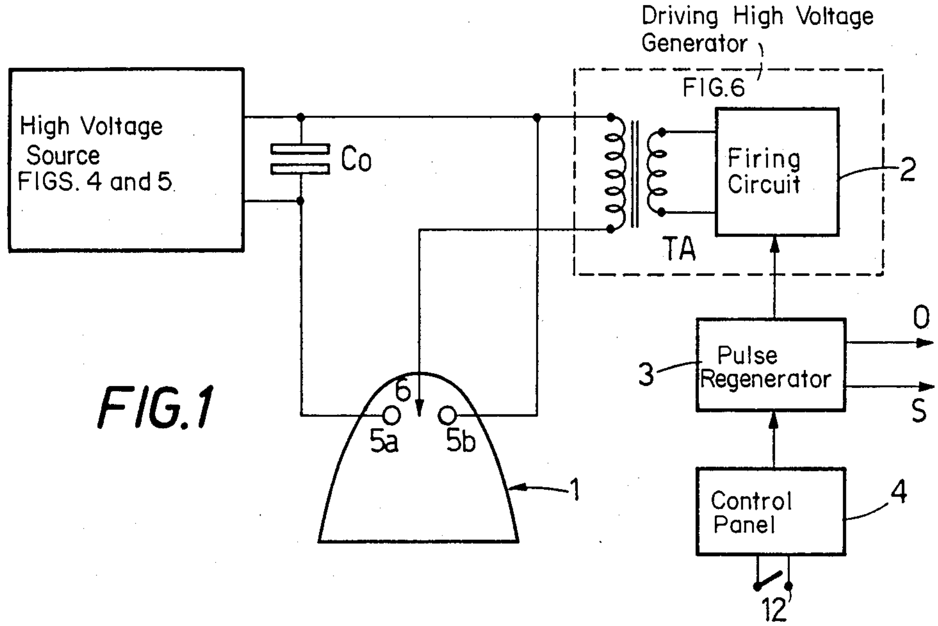
FIG. 1 is a scheme of a seismic wave source according to the present invention.

With reference to FIG. 1 where the main components of the seismic wave source are schematically represented, number 1 is an electroacoustic transducer, H.T. is a high-voltage generator, $C_o$ is a capacitor set, the dotted block E.H.T. represents a driving high-voltage generator with its firing circuits 2 and a transformer TA; 3 is a synchronism pulse generator, 4 is a remote control panel. The electroacoustic transducer 1 has a metallic structure shaped like an empty round paraboloid, closed at its base by means of an elastic diaphragm which will be described in detail later on.

In its inside, which is filled with an insulating liquid with high electrical resistivity and not very high dielectric strength such as vaseline oil, two main electrodes 5*a* and 5*b* are set and an auxiliary electrode 6 is put between the first ones.

The H.T. generator charges the set of capacitors ($C_o=360$ μF) at about 2500 V. The corresponding value of the electrostatic energy stored in the capacitors is about 1.1 kJ. The armatures of the capacitors are connected to two tungsten electrodes 5*a* and 5*b*. The lack of medium ionization does not allow, in normal conditions, an electric discharge in the 3 mm gap of the electrodes. The discharge starts only when a difference of potential of 150 kV, applied between the auxiliary electrodes 6 and the electrode 5*b*, produces a preliminary low energy spark, capable to ionize the liquid. Then the set of capacitors $C_o$can discharge its energy, producing a high intensity spark between the electrodes 5*a* and 5*b* and consequently an acoustic impulse in the liquid medium. After the discharge process, the H.T. generator produces a new charge of the capacitor set and all the cycle can start again.

The firing electric impulse (150 kV) is produced by the E.H.T. generator. The primary coil of the transformer TA is excited by a 400 V tension, controlled by the trigger circuits 2. The trigger pulse generator 3 produces the electric pulses necessary to drive the seismograph and an oscilloscope (or another control instrument), these latter being indicated in the figure simply by an arrow S and an arrow O. The trigger circuit 2 is driven manually by a push-button 12 in the control panel 4. A more detailed description of all the components of the seismic source follows.

Figure 2:
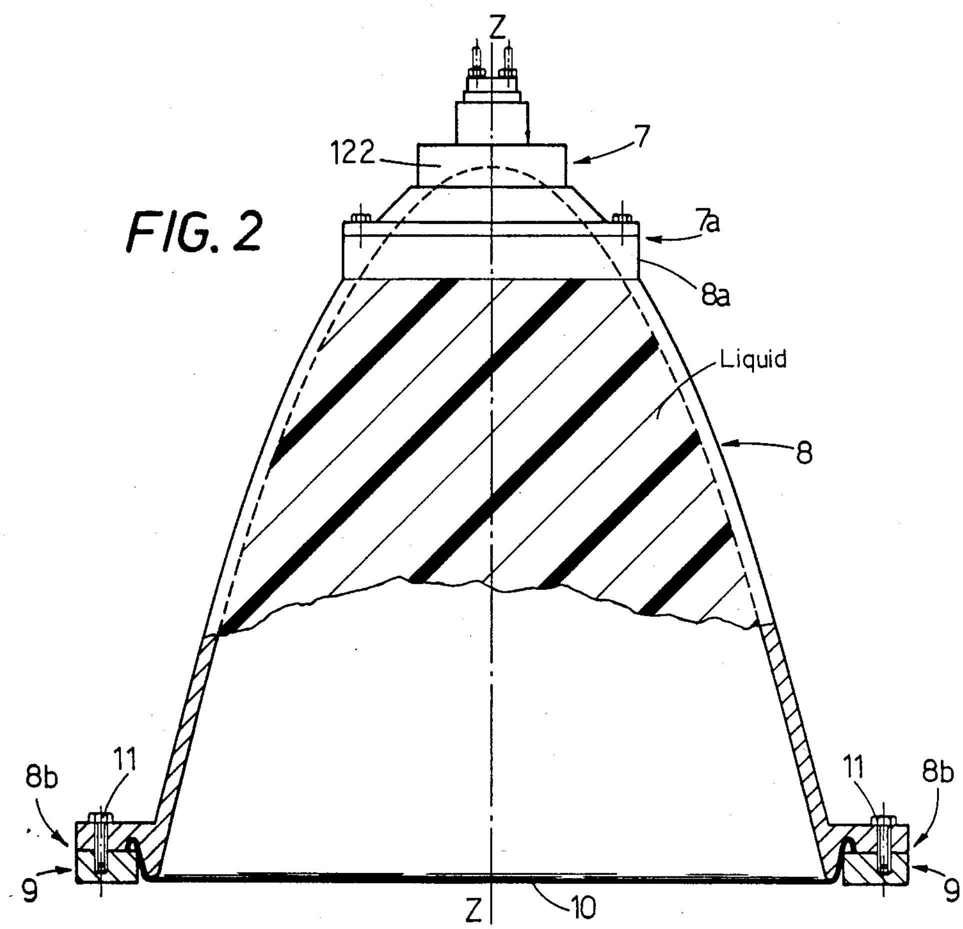
FIG. 2 is a part section vertical view, of a parabolic transducer of the invention.
Figure 3:
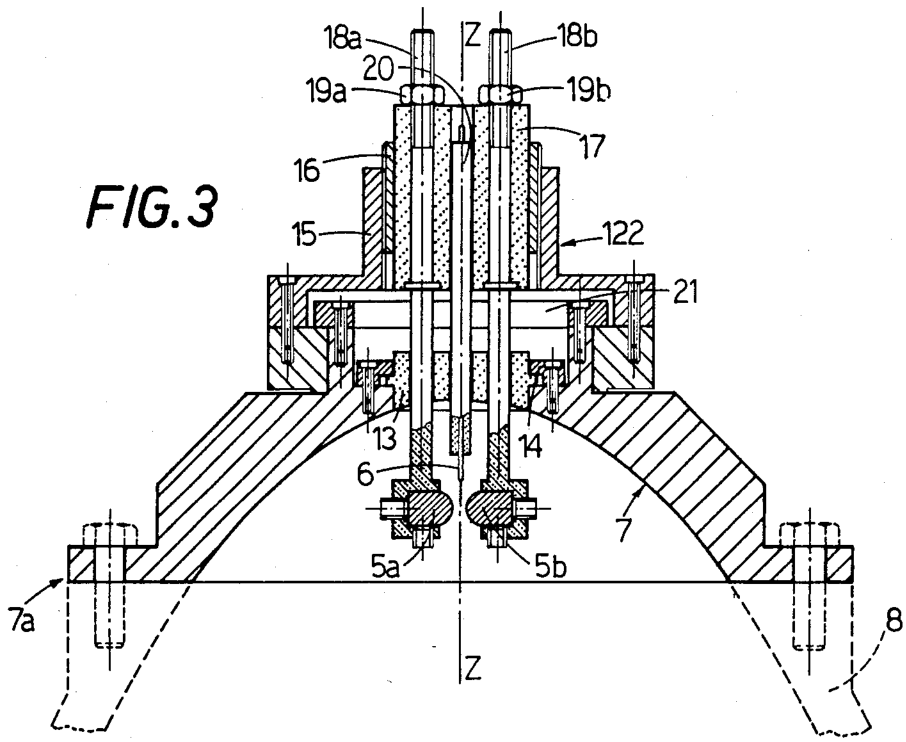
FIG. 3 is an enlarged longitudinal section of the transducer head of FIG. 2.

The mechanical part of the transducer is a parabolic reflector of alluminium alloy (e.g. anticorodal), manufactured by means of the lost-wax casting techique. The thickness of the walls is about 1 cm. As shown in the FIGS. 2 and 3 the transducer 1 is made up of three principal parts: a head 7, containing the electrodes leaning inside the paraboloid, a body 8, and a locking ring 9, which tights an elastic diaphragm 10 at the end of the base of the paraboloid. The body 8 has a flange both on the upper side in 8*a*, connected with the end 7*a*, which has a corresponding flange on the head 7, and below in 8*b* to join the locking ring 9 by means of the screws 11. The flange 8*b* has a groove on its circumference, which holds both the peripheric edge of the diaphragm 10, and a peripheric protrusion on the locking ring facing the corresponding groove so that the diaphragm edge could remain locked between the groove and the protrusion. So the diaphragm, which can be neoprene-made, results in turn well tightened. The coupling of the head to the body between the flanges 7*a* and 8*a* is accomplished simply by bolts and an O-ring, so that an easy separation of the head from the body is allowed, for a quick setting of the electrodes or a complete replacement of the head, if required.

The head 7 of the paraboloid, which has an hole in its top, is surmonted by a dome 122 (FIG. 3), which a acts to support and adjust the electrodes. In particular, the head 7 is closed by a substantially cylindrical element 13 with convex base, of insulating material, like nylon, drilled for the passage of the rests of the three electrodes, and provided on its circumference with protrusions, by which it is locked to the head 7 through a ring nut 14, fixed to the head by screws. In a similar movable manner, on the head 7 is mounted a coupling item 15 threaded inside for holding a counter-threaded ring 16, at the inside of which is inserted, with forced coupling, a cylindrical nylon-item 17 coaxial with the item 13 and suitably drilled. The rests 18*a* and 18*b* of the electrodes 5*a* and 5*b* are copper bars passing through the cylindrical items 13 and 17. They are fixed to the cylindrical item 17, and then to the ring 16, by the nuts 19*a* and 19*b*, screwed on the respective threaded upper ends. The main electrodes 5*a* and 5*b* are mounted adjustable on the lower ends of the rests 18*a* and 18*b*, in opposite position. Between them is placed the auxiliary electrode 6, mounted in the lower end of the nylon-rest passing through the cylindrical items 13 and 17.

It is a matter of course that by means of that arrangement the electric insulation requirements are met and meanwhile the electric conductivity of the electrodes, which are tungsten made. Moreover the above described apparatus for supporting the main electrodes 5*a*, 5*b* and for setting their position is made so that some movement of the electrodes barycentre is allowed both along the axis of the paraboloid (±15 mm max. with respect to the focal point) simply by wheeling the coupling item 15, and in a perpendicular direction for setting the gap between the two electrodes. Such a mechanism affords, for suitable ratio of base-diameter to the wave-length the possibility of modifying, to a certain extent, the beam-width of the source by inching down or up the electrodes with reference to the focus. The cylinders 13 and 17 are crossed by two holes, not visible in the FIG. 3, which allow a breather of the combustion gas-bubble from the paraboloid and a partial damping of the pressure impulse on the liquid, with the production of a liquid flow through the flow-off chamber 21. Moreover the holes allow an easy vent of the air during filling the paraboloid up with liquid.

In the field operation, the paraboloid is put on a proper digging up filled with water and it is loaded by suitable lead rings in order to fix it on the soil and prevent bobbing. The same result can be obtained by applying on the source an hydraulic jack anchored to the vehicle which constitutes the mobile lab. As regards to the electroacoustic transducer in its complex, it was designed so as to obtain a sufficient directivity of the acoustic wave for frequency values in the range of kHz, with the barycentre of the electrodes on the focus of the paraboloid. The base size has the maximum influence on the directivity at lowest frequencies. Therefore the design of the parabolic dome was a compromise between the need of a reasonable large base-dimension to limit an excessive acoustic beam-divergence and that of an enough small dimension to allow an easy manual transport of the source in the field.

So, as a first step the following dimensions were fixed: focal length=3 cm; inside base-diameter=50 cm; height=52.1 cm.

Figure 4:
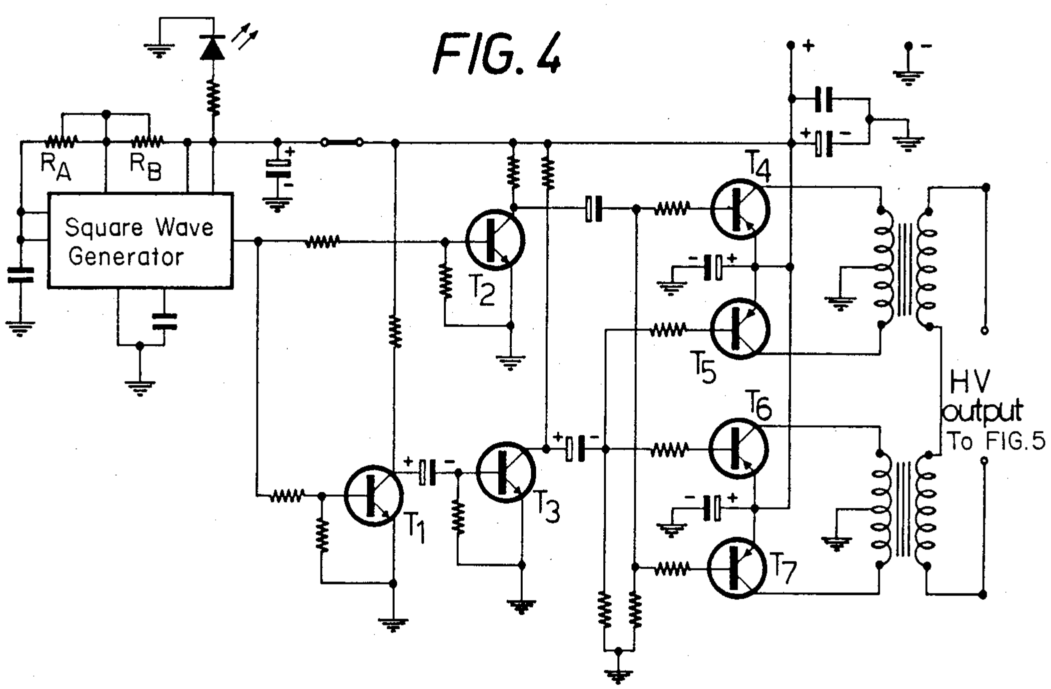
FIG. 4 is a schematic electric diagram of an H.T. generator utilized in the embodiment of the invention.

In the FIG. 4 is shown the schematic diagram of the high voltage generator H.T.. A power inverter is used in this circuit to obtain the high voltage from a low voltage supplied by an accumulator battery (12 V, 60 A/h). The battery supply was choosen for two main reasons:

(a) the apparatus at issue must operate outdoors also in places where the electrical distribution network is not available;

(b) the use of high voltage is safer for the operator if there is no connection with the ground of the electrical distribution network.

Figure 5:
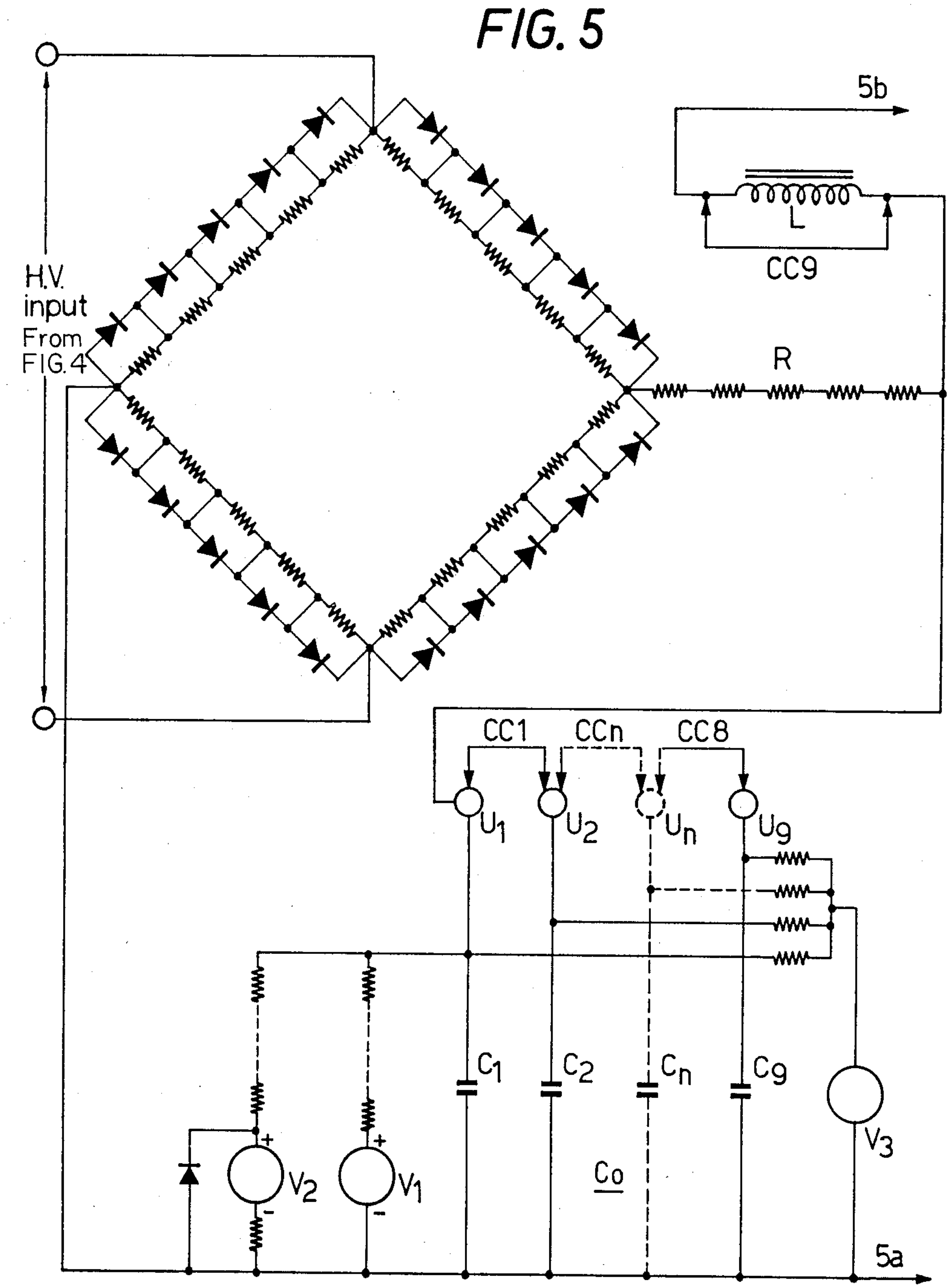
FIG. 5 is an interconnection scheme between the capacitors and a high-voltage rectifier both utilized together with the H.T. generator of FIG. 4.

The inverter is made not to be self-oscillating in order to vary easily the frequency of operation. Therefore an integrated circuit NE 555 was employed to produce a square wave of variable frequency in the range 100 Hz–25 kHz, by setting two resistive trimmers RA and RE. The transistor T1 inverts the phase of the signal produced by the oscillator, in order to drive the final power-darlington T4, T5, T6, T7 through two decoupling-transistors T2 and T3, to deliver the required driving current. Two push-pull final stages are employed, connected to two separate output transformers, with their secondary coils in series, in order to reach the required voltage of 2500 V. This configuration is possible as both final stages are driven by the same oscillator, besides it allows the use of commercial ferrite cores and make easier the secondary coils insulation. In the FIG. 5 is shown the connection of the set $C_O$ of capacitors C1, C2, . . . C9 to the H.T. generator. Each capacitor has capacitance of 40 $\mu$F and a maximum working voltage of 3000 V. The parallel connection of nine capacitors allows a total capacitance of 360 $\mu$F. This configuration, allows the possibility of varying the total capacitance from 40 to 360 $\mu$F, by varying the number of capacitors connected in parallel. For this purpose eight copper bare-wires CC1, CC2, . . . CC8 are used to set the desired value of total capacitance. The possibility of easily varying the capacitance value, in the field measurements, makes available, within certain limits, various frequency bands. For instance, those centered on the lower or on the higher frequencies according to the desired depth or resolution. In fact, the frequency band shifts to lower values with the increasing of the capacitance $C_o$ and vice versa. By the same way the insertion, in series with the main electrodes 5*a* and 5*b*, of a suitable inductor L, through the bare wire CC9, produces a shift and a reinforcement of lower spectral components. The voltage produced by the inverter is rectified by a Graetz bridge in which five diodes are utilized in series for each side, equipped with balancing resistor of the leakage currents. The charge of the capacitors takes place through the resistor R (5 kohm, 100 W), which determines the time required by the charge of the capacitors. The resistor R is so dimensioned that the inverter, at the discharge time, has a load not too low. The resistor R limits the maximum current required to the inverter to 0.5 A. The same resistor protects the diodes also when the voltage at the ends of the capacitors is inverted, for the presence of oscillating phenomena, due to parasitic inductive components.

Two voltmeters are connected to the terminals of the capacitors to read their voltage; V1 is utilized for the range 0–2500 V; V2, for the range 0–300 V, reads the same tension as V1, in the range of values that corresponds to few division above V1. A third voltmeter V3 is also used, for safety sake, to control the charge status of each capacitor through a resistor network.

Figure 6:
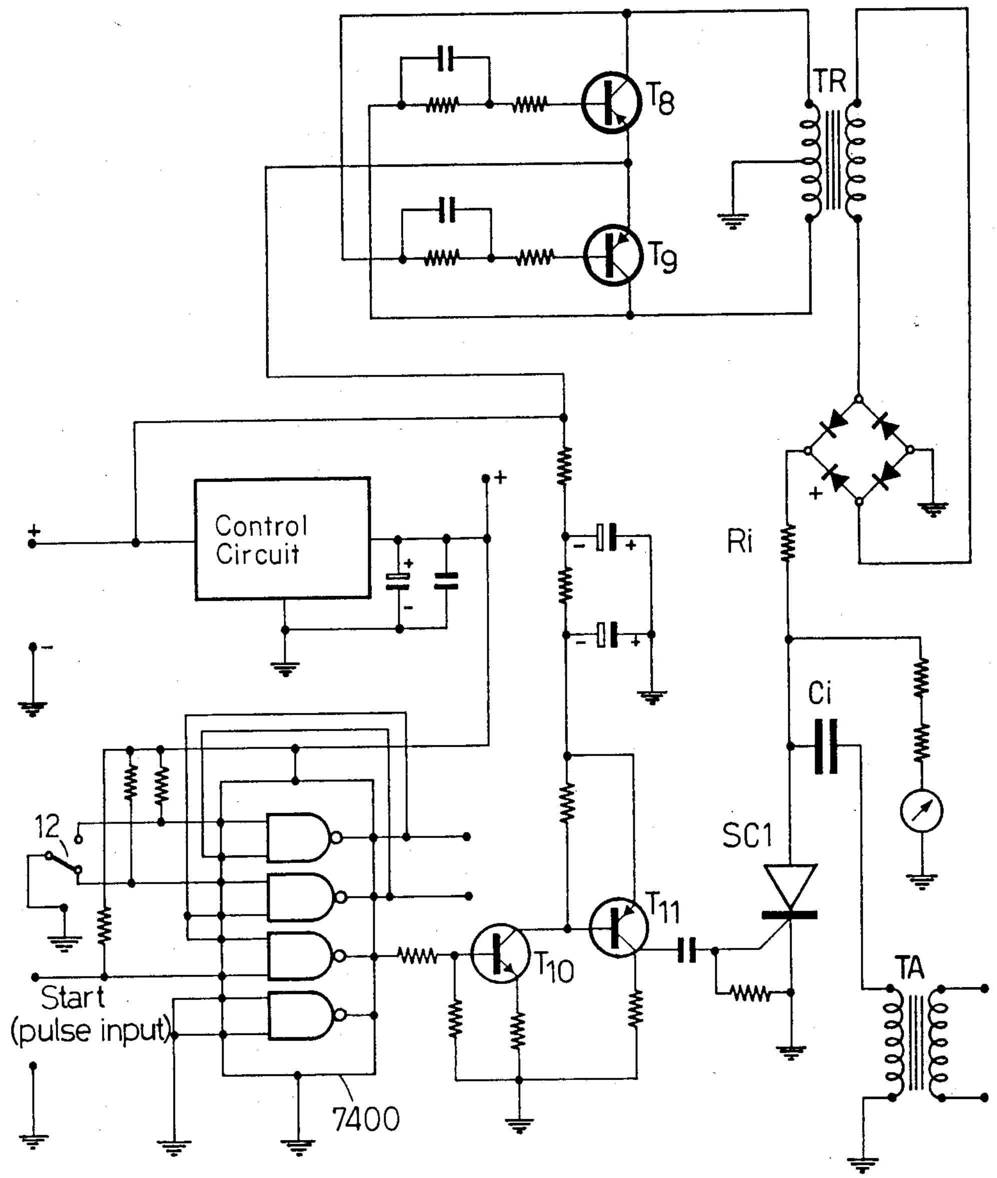
FIG. 6 is a schematic electric diagram of an E.H.T. generator with pertinent trigger circuits utilized in the embodiment of the invention.

The FIG. 6 shows the E.H.T. generator and the trigger circuits. Also those circuits are supplied by 12 V D.C., for the same reasons above mentioned. A very simple inverter, with a self oscillating configuration (T10, T11), is used to generate a voltage of about 400 V, which charges the capacitor Ci through a bridge rectifier and the resistor Ri. Ci is connected to the primary coil of the ferrite-transformer TA, with coils in oil-bath and transformation ratio 1:400. A silicon controlled rectifier SC1 is used to switch to the ground the circuit capacitor-primary of TA. When it happens, the capacitor discharges very quickly and the electric pulse on the primary of TA produces on the secondary coil a peak of voltage of about 150 kV, which is sent to the trigger electrode of the paraboloid for firing the spark. The integrated circuit 7400 (FIG. 6) with a couple of transistors T3 and T4 (FIG. 4) make up the control logic for the SC1 gate and generate also two synchronization impulses for the seismograph and for another external control instrument (usually an oscilloscope). The triggering pulse for the E.H.T. system is sent to the START input either manually, by means of the push-button 12, or automatically, by means of an external apparatus, which can be a microcomputer system. All the logic signals on input and output are TTL standard.

Figure 7:
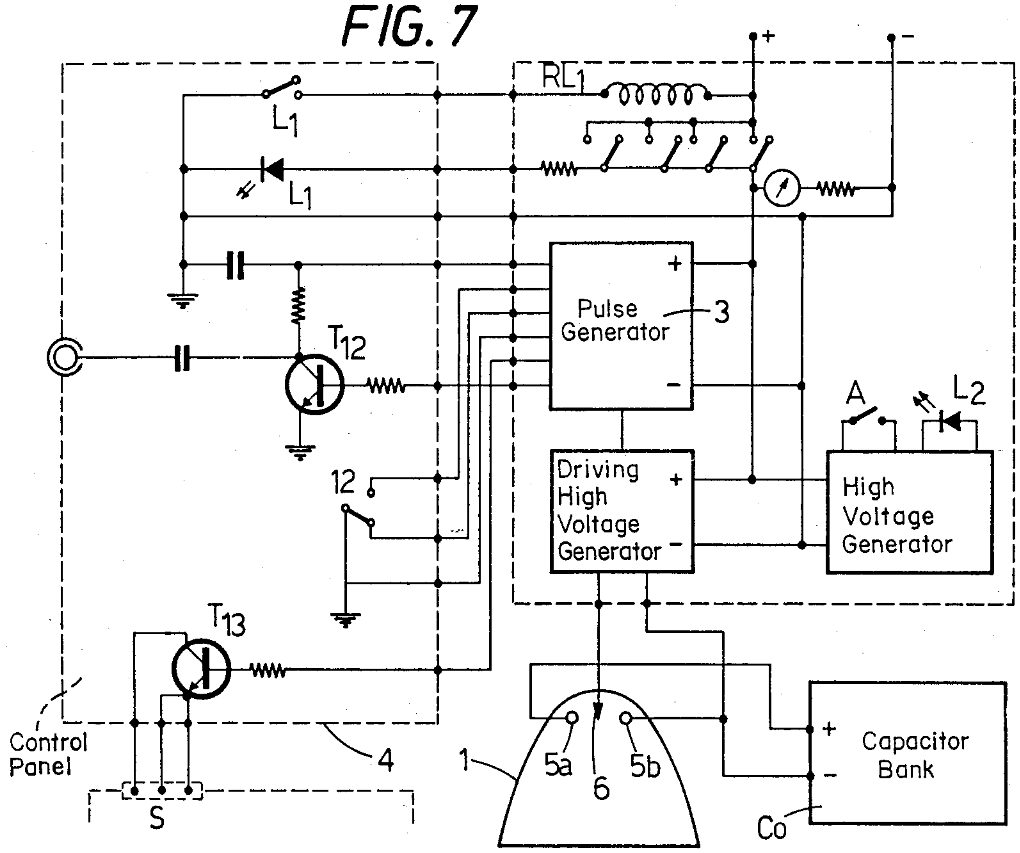
FIG. 7 is a schematic diagram showing the electrical connections among different parts of the seismic source according to this invention.

In the FIG. 7 is shown the interconnection of the circuits above described. The block 3 represents the synchronism pulse generator, Co the charge system of the capacitors. S represents the seismograph. The control console 4 is put on a panel near to the seismograph. The switch 12 drives the antibounce circuit, which produces the trigger pulse for the E.H.T. generator.

The 12 V power supply circuit is switched on and off by the relay RL1, driven by the switch I. The power-on of the system is indicated by the LED L1. In the control panel there are also two buffers T12 and T13 for the seismograph and oscilloscope synchronism pulses. The seismograph is interfaced according to the open collector techniques, as required by its manufacturer. The switch A allows to start or stop the H.T. driving oscillator; the presence of the H.T. is signaled by the LED L2. In such a way it is possible to produce the H.T. voltage for the capacitors charge, by switching only low voltage signals. This is very useful because often it is suitable to test the apparatus, only as far as concerns the output of the auxiliary spark and synchronism signals, without firing the high energy discharge, which, as desired, can be subsequently activated.

Figure 8:
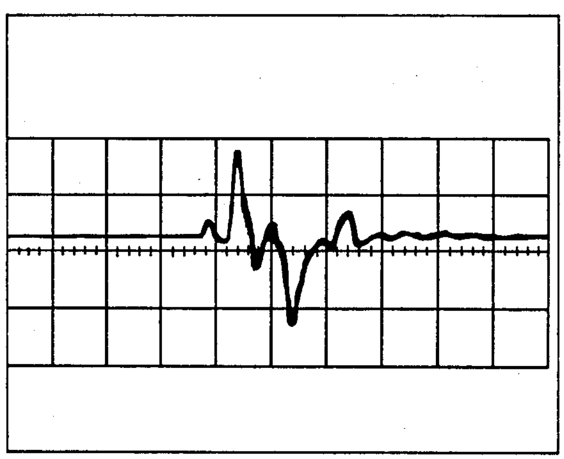
FIG. 8 reproduces an oscilloscope picture of the acoustic pulse produced by the parabolic transducer and detected on the axis of symmetry Z at a distance $z=100$ cm from the base plane; the voltage V (scale 1V/div) is given on ordinate axis and the time t (scale 100 μs/div) on abscissa axis.
Figure 9:
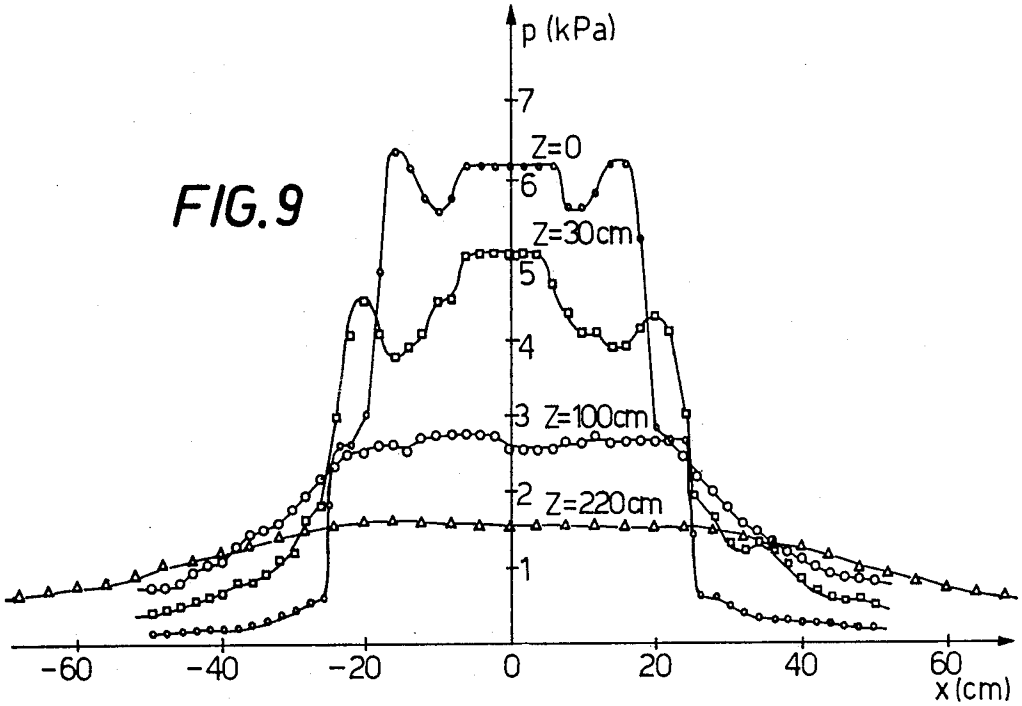
FIG. 9 is a diagram showing the experimental acoustic pressure distribution in air, for the empty paraboloid; the pressure being revealed along some different planes at right angles with respect to the axis of symmetry of the paraboloid; the acoustic pressure p in kPa is given on ordinate axis, and the distance x measured in cm on the planes at right angle to the Z axis is given on abscissa axis. The figures shown have, as parameter, the distances z measured on Z axis from the paraboloid base.
Figure 10:
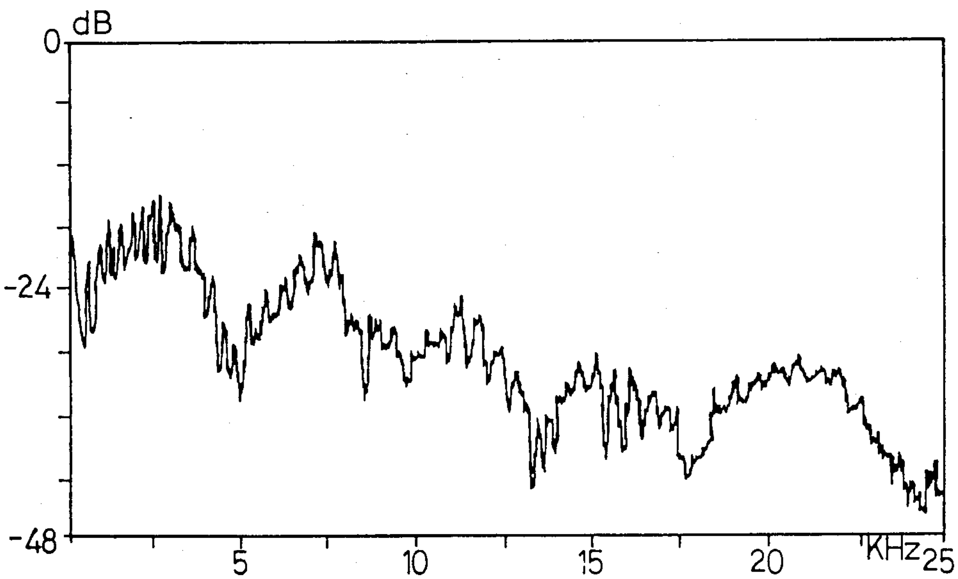
FIG. 10 is a diagram showing the amplitude spectrum of the acoustic pulse of FIG. 8, with dB on ordinate axis and kHz on abscissa axis.

Preliminary measurements were carried out in the air, with the empty paraboloid, in order to characterize the transducer. In laboratory an equipment was used consisting of a ¼ inch B & K microphone, capable to measure sound pressure levels up to 180 dB; an amplifier and a tektronix storage oscilloscope provided with a Polaroid camera. The acoustic-field measurements was made by evaluating the amplitude of the first half-cycle of the pulse read on the oscilloscope (FIG. 8), for some different planes at right angles to the axis of symmetry of the paraboloid (Z-axis) and distant from the base $z=0$, $z=30$ cm, $z=100$ cm, $z=220$ cm respectively. The acoustic-field diagrams are shown in FIG. 9. The experimental accuracy is about a few units percent both for the acoustic pressure and for the distance values. In the first two diagrams corresponding to $z=0$ and $z=30$ cm, acoustic pressure oscillations typical of the near field are noticed, on the contrary, in the other diagrams relative to $z=100$ cm and $z=220$ cm it is evident the characteristic behaviour of the far field. The width of the main beam is $2\alpha=28°$; it was determined graphically, evaluating the x abscissa value corresponding to the a - 6 dB value from the maximum of the acoustic pressure at the distance $z=220$ cm, by means of the relation:$\alpha=\text{arctg } x/z$. The amplitude spectrum of the acoustic pulse given in FIG. 8, is shown in the frequency range 0–25 kHz in FIG. 10. It was processed by means of a PDP 11/34 A computer provided with a 12 bit-A/D Converter and a VT55E graphic terminal with "hard copy" the signal acquisition at a sampling frequency of 55 kHz, was carried out on rigid disc (10 Mbyte) which allows to semplify greatly the pulse capture because it can store signals with time duration of the order of minute. The useful samples, corresponding to the acoustic pulse, were insulated within a 1024 sample "window", by means of a suitable software program. At last, the amplitude spectrum wad determined using a FFT algorithm.

FIG. 10*bis* is a further laboratory test showing an important feature of the electroacoustic source giving the possibility of modifying the frequency spectrum of the acoustic pulse by a suitable variation of electrical circuit-parameters like capacitance.

More particularly FIG. 10*bis* is a comparison between the power-spectrum of the acoustic pulse in air for a capacitance value $C_o=40$ $\mu$F (a) and that for $C_o=360$ $\mu$F (b). Both signals were detected at a distance of 1 m from the paraboloid-base on its symmetry axis. It is evident that an increase of capacitance produces a shift of spectrum-components towards lower frequencies. A similar result can be also obtained by putting a suitable inductance in series in the circuit of the main electrodes.

The acoustic impulse of the parabolic source was detected on the field for different experimental conditions. FIGS. 11*a* and 11*b* show the source signatures for one shot, at a depth of 2 m in weathered soil. Two cases are illustrated corresponding to two different values of capacitance: 40 $\mu$F and 360 $\mu$F respectively. In the same FIGS. 11*a* and 11*b*, the amplitude frequency spectra of the signals are also given. The pulses were picked up by means of a hydrophone placed beneath the source on the axis of the paraboloid, through a proper water-filled hole made almost horizontally into the ground. The signals were recorded on a FM tape recorder and processed in the laboratory by a FFT algorithm.

In FIG. 11*a* relative to 40 $\mu$F, it may be noticed that the source signal has the highest peaks at frequencies between 100 and 350 Hz and also significant frequency components still at about 800 Hz. In the diagrams shown in FIG. 11*b* ($C_o=360$ $\mu$F); the acoustic impulse exhibits a sharp peak at about 70 Hz and two other pronounced peaks are present around 250 Hz.

However, the contribution to higher frequencies is less evident than in the case shown in FIG. 11*a* because of an appreciable shift of the frequency components toward the lower frequencies.

As already shown for the laboratory tests it is possible to modify, to a certain extent, the frequency spectrum of the acoustic impulse by a proper variation of the electric circuit-parameters. First seismogram records were carried out in a site near the town of Tivoli (Rome, Italy) where an approximate knowledge of the subsurface structure was known from the presence of a nearby travertine quarry. An example is given in FIGS. 12P and 12H where a 100 ms seismogram record, corresponding to two shots of the parabolic source (P), is compared with that (H) obtained by striking two blows of 5 kg - sledge hammer or a metallic plate firmly put on the ground. The seismic signals were detected by means of twelve vertical 14 Hz - geophones spacing of 0.8 m along a straight seismic line. The source off-set to the first geophone was 8 m in both cases.

The recording system was a 12-channel digital enhancement seismograph connected to a multichannel digital tape recorder. The same amplifier gains were set both for the hammer source and the paraboloid. Clearly defined events in the 0–70 ms range are evident in the seismogram corresponding to the parabolic source (P). They can be interpreted as reflections on a succession of shallow travertine-clay interfaces. The same events are less evident in the hammer seismogram (H). At greater depth the electroacoustic source seems to exhibit a better penetration capacitance in comparison with the sledge hammer.

The electroacoustic source, according to this invention, can be utilized as well on land as more profitably in underwater acoustic prospectings, by providing suitable electric insulation means, water proofing and water tight means, according to the art of the field. In this latter application the utilized frequency range is setting toward values higher than those of the land.

We claim:

1. A seismic source adapted for high resolution seismic prospecting comprising:

an electroacoustic transducer including a metallic hollow bell-shaped structure having a closed head and an open base that is closed by an elastic diaphragm, and being filled with a dielectric liquid, the structure having an inner reflective surface in the shape of a circular paraboloid having a vertical axis and a focal point, the structure further enclosing a pair of main electrodes positioned near the head on opposite sides of the focal point and with a gap therebetween, an auxiliary electrode positioned in the gap between the two main electrodes, and means for moving the main and auxiliary electrodes vertically along the vertical axis to vary their distance from the focal point and for moving the main electrodes horizontally normal to the axis to vary the width of the gap;

first circuit means for storing energy in a capacitor bank for maintaining a voltage across the main electrodes insufficient for initiating a discharge across the gap so long as the dielectric liquid in the gap is not ionized, and;

second circuit means connected between one of the main electrodes and the auxiliary electrode for establishing therebetween controllably a voltage sufficient to ionize the dielectric liquid in the gap whereby there is triggered an electrical discharge between the two main electrodes across the gap for exciting an acoustic wave in the dielectric liquid directed at the elastic diaphragm at the base end of the hollow structure.

2. A seismic source in accordance with claim 1 in which the first circuit means include a bank of capacitors of which selected ones may be connected in parallel for storing energy to be supplied to the main electrodes for creating the discharge across the gap.

3. A seismic source in accordance with claim 2 in which the first circuit means includes an inductor.

4. A seismic in accordance with claim 1 in which the first circuit means provides a voltage of about several thousand volts to the main electrodes and the second circuit means provides a voltage of at least a hundred thousand volts between the auxiliary electrode and one of the main electrodes.

5. A seismic source according to claim 1 which further includes means for adjusting the spacing of the main electrodes about the focal point.

6. A seismic source according to claim 5 which further includes means for adjusting the axial position of the main and auxiliary electrodes relative to the focal point.

* * * * *